Dec. 11, 1951 A. D. MORTRUDE 2,577,976
COCKTAIL SHAKER
Filed Dec. 2, 1947 2 SHEETS—SHEET 1
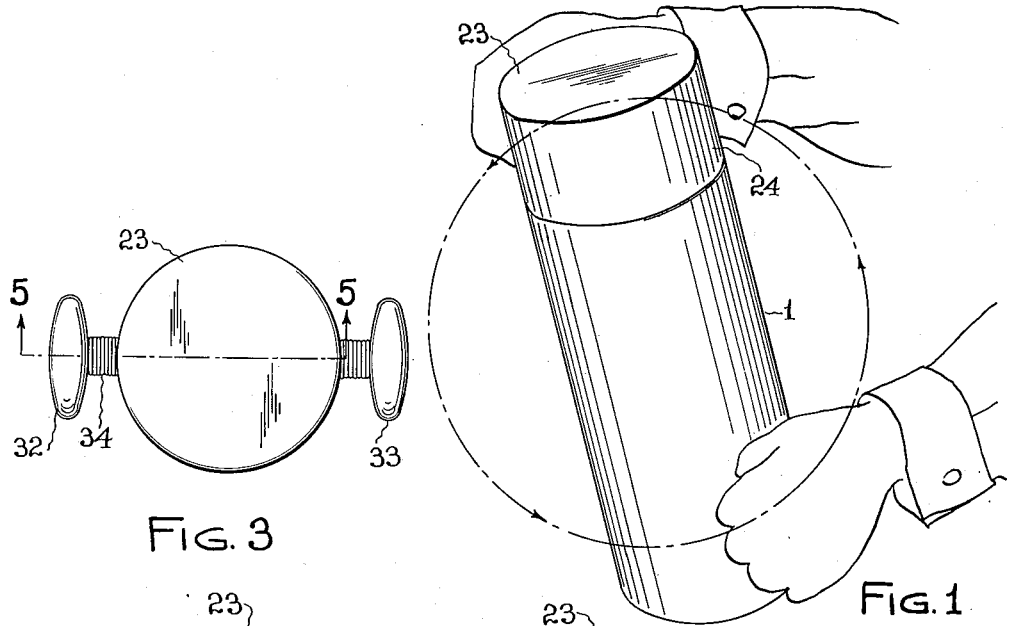
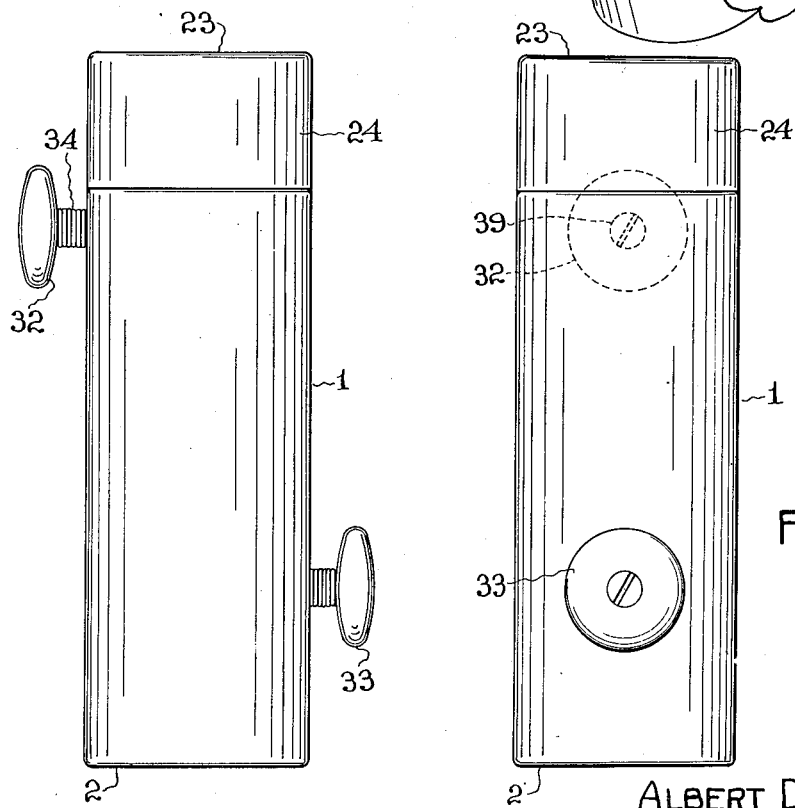
INVENTOR.
ALBERT D. MORTRUDE
BY
William Iler
ATTORNEY.

Dec. 11, 1951     A. D. MORTRUDE     2,577,976
COCKTAIL SHAKER
Filed Dec. 2, 1947     2 SHEETS—SHEET 2
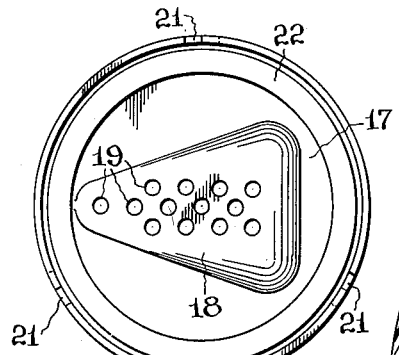
Fig. 8
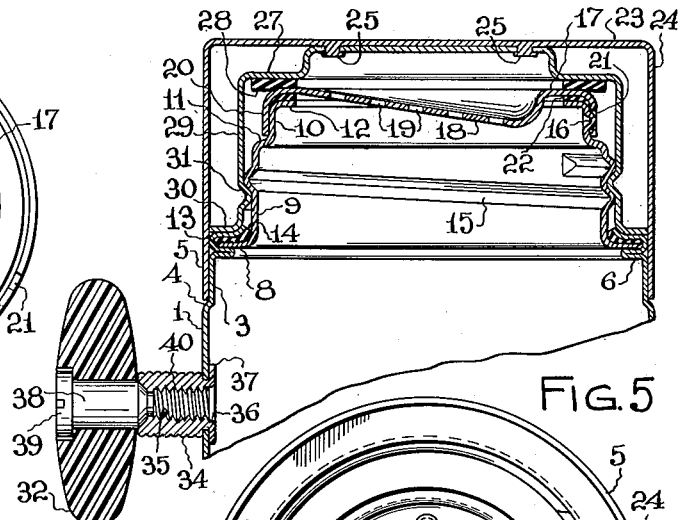
Fig. 5
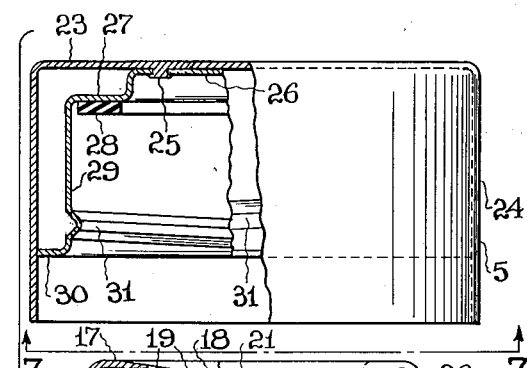
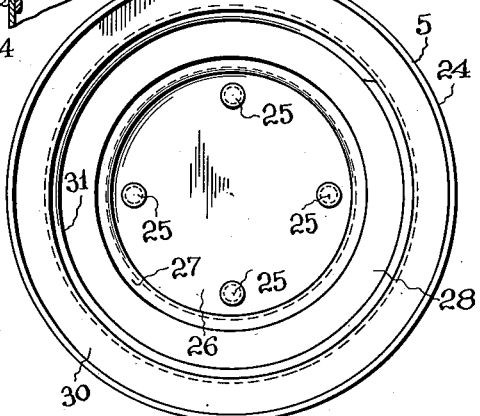
Fig. 7
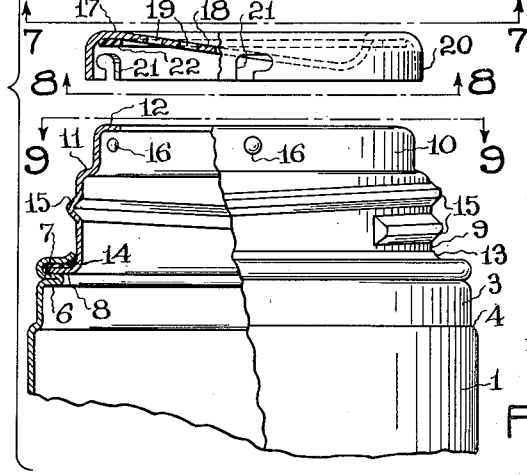
Fig. 6
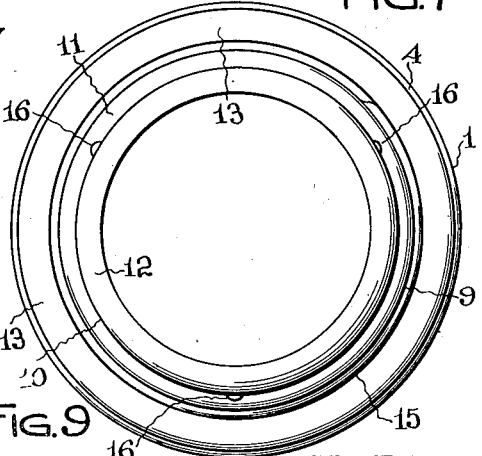
Fig. 9
INVENTOR.
ALBERT D. MORTRUDE
BY William Isler
ATTORNEY.

Patented Dec. 11, 1951

2,577,976

UNITED STATES PATENT OFFICE 2,577,976

COCKTAIL SHAKER

Albert D. Mortrude, Detroit, Mich.

Application December 2, 1947, Serial No. 789,246

8 Claims. (Cl. 259—72)

This invention relates, as indicated, to a cocktail shaker.

A primary object of the invention is to provide a cocktail shaker which is operable in a unique manner to produce a thorough mixing of the ingredients of cocktails or other beverages contained within the shaker.

Another object of the invention is to provide a cocktail shaker of the character described having a novel arrangement of actuating or operating handles or knobs.

A further object of the invention is to provide a cocktail shaker of the character described having a novel construction of certain of the parts thereof, and more particularly the container neck, strainer and closure thereof.

A further object of the invention is to provide a cocktail shaker of the character described, which consists of a minimum number of parts, of inexpensive rugged construction, and which can be quickly and easily assembled into a shaker of neat and attractive design.

A still further object of the invention is the provision of a novel and unique method of mixing the ingredients of a cocktail or other beverage.

A still further object of the invention is the provision of a novel and unique method of actuating or operating a cocktail shaker to mix the contents thereof.

Other objects and advantages of the invention will be apparent during the course of the following description.

In the accompanying drawings, forming a part of this specification, and in which like numerals are employed to designate like parts throughout the same, Fig. 1 is a view showing the cocktail shaker of the present invention in perspective, and indicating also the manner in which the shaker is rotated to mix the contents thereof;

Fig. 2 is a front elevational view of the shaker;

Fig. 3 is a top plan view of the shaker;

Fig. 4 is a side elevational view of the shaker, as viewed from the right side of Fig. 2;

Fig. 5 is a fragmentary cross-sectional view of the upper portion of the shaker, taken along the line 5—5 of Fig. 3;

Fig. 6 is an exploded view of the parts shown in Fig. 5, but with portions thereof in elevation;

Fig. 7 is a bottom plan view of the closure or lid of the shaker;

Fig. 8 is a bottom plan view of the combination strainer and pouring spout, and

Fig. 9 is a top plan view of the body of the shaker.

Referring more particularly to the drawings, the cocktail shaker will be seen to comprise a body portion 1 of cylindrical form, having a bottom 2, which is formed integrally with the body 1. The body is preferably formed of aluminum, being either stamped or spun from a sheet. The upper end of the body 1 is spun or formed to provide an annular extension 3 of slightly smaller diameter than the body 1, providing a ledge or shoulder 4, which, as shown in Fig. 5, serves as a stop for the lower edge of the closure or cap of the cocktail shaker, said closure being generally designated by reference numeral 5.

The upper end of the body 1 is then formed to provide an annular radially-inwardly extending flange 6, which is rebent to provide an annular radially-outwardly extending flange 7, which serves as a seat for the flange 8 of a stamping or spinning which forms the neck of the body 1 of the shaker. This neck stamping or spinning includes an annular body portion 9, and an annular extension 10 of smaller diameter than the portion 9, providing a ledge or shoulder 11, which, as shown in Fig. 5, serves as a stop for the lower edge of a combination strainer and pouring spout, to be presently described. The extension 10 of the neck terminates at its upper end in a radially-inwardly extending flange 12.

The flange 8 of the neck stamping or spinning is permanently secured to the flange 7 of the body member by crimping the upper end 13 of the body member over the flange 7, as clearly shown in Figs. 5 and 6, a gasket or washer 14, of rubber or the like, being interposed between the flanges 7 and 13 to insure a fluid-tight joint between the body and neck of the shaker. The body portion 9 of the neck member is spun or formed to provide an outwardly directed spiral thread 15, and the extension 10 of the neck member is provided at circumferentially-spaced points with embossments 16, forming pins which serve a purpose to be presently described.

The combination strainer and pouring spout, which is best shown in Figs. 5, 6 and 8, is in the form of an inverted cup-shaped stamping, the body 17 of which is indented or depressed to provide a triangular shaped area 18, which functions as a pouring spout, the contents of the shaker passing through perforations 19 in this spout, and into the spout, the converging sides of which divert the liquid towards the narrow end of the area 18 (see Fig. 8). The spout 18, as will be readily apparent, also serves as a strainer, preventing passage of large particles, such as fruit seeds, pulp, etc., through the openings or perforations 19.

The strainer and pouring spout further includes a downturned flange 20, which is provided at points spaced circumferentially to correspond with the spacing of the pins 16, with bayonet slots 21. After the ingredients of the cocktail or other beverage are placed in the shaker, the strainer and pouring spout is secured to the neck of the shaker, as by causing the embossments or pins 16 to enter the vertical portions of the slots 21, after which the strainer is rotated to cause the embossments 16 to enter the horizontal portions of these slots. To insure against leakage of the contents of the shaker through the joint between the strainer and the neck member, a gasket or washer 22 of rubber or the like is adhesively secured to the body 17 of the strainer and bears against the flange 12 of the neck member when the strainer is secured to the neck member.

The shaker further includes a closure or cap, comprising an outer portion of inverted cup shape, and an inner portion. The base 23 of the outer portion has a depending flange 24, the lower end of which bears against the shoulder or ledge 4 when the closure is secured to the body of the shaker.

The base 23 is provided with a plurality of depending circumferentially-spaced extrusions 25, constituting rivets which serve for the permanent attachment to said base of the inner portion of the closure.

The inner portion of the closure or cap is also of inverted cup shape, comprising a base portion 26 which is riveted to the base 23, a radially-outwardly extending flange 27, to the lower surface of which a gasket 28 of rubber or the like is adhesively secured, a tubular side wall 29, and a radially-outwardly extending flange 30 which extends into engagement with the inner surface of the flange 24 of the outer portion of the closure.

The side wall 29 of the outer closure portion has rolled or otherwise formed therein an inwardly extending spiral thread 31 adapted for engagement with the threads 15 of the neck member.

After the strainer has been secured to the neck of the shaker, the closure which has been described is threaded onto the neck of the shaker, the ledge 4 forming a stop for determining the maximum movement of the closure relatively to the body of the shaker. In thus securing the closure to the neck of the shaker, the gasket or washer 28 is compressed slightly upon the periphery of the strainer, as shown in Fig. 5, thereby insuring against leakage of the fluid contents of the shaker through the joint between the closure and strainer.

The shaker also includes a pair of knobs or handles 32 and 33, which are preferably made of a plastic, and which are mounted on the body 1 of the shaker in the following manner.

Rigidly secured to the body 1 of the shaker at a point closely adjacent the upper end of the latter is a stake nut 34, which is interiorly threaded, as at 35. The nut is provided with an extension 36 of reduced external diameter which extends through an opening in the wall of the body 1, and the inner end of which is rolled or peened over into engagement with the inner surface of the body 1, as at 37, thereby rigidly securing the nut 34 to the body 1. The nut extends radially from the body 1. The knob or handle 32 is rotatably mounted on the shank 38 of a mounting screw 39, said shank having a reduced threaded portion 40, which is threaded into the threads 35 of the nut 34.

The knob or handle 33 is similarly mounted on the body 1 of the shaker, but at a point at the diametrically-opposite side of the body, and closely adjacent to the lower end of said body, the handle 33 extending from the body in a direction opposite that in which the handle 32 extends.

It will be noted in Figs. 2 and 4 of the drawings that the knob or handle 33 is located at approximately the same distance from the lower end of the shaker that the knob 32 is located from the upper end of the shaker.

Fig. 1 illustrates, in a somewhat diagrammatic manner, the manner in which the shaker is actuated or rotated in order to mix the contents of the shaker. For this purpose, the knob 32 of the shaker is grasped by one hand and the knob 33 grasped by the other hand, after which the shaker is rotated in a plane in which the axis of the shaker lies. This plane extends forwardly from and at substantially a right angle to the general plane of the person operating the shaker.

This manner of rotating the shaker is greatly facilitated by virtue of the fact that the knobs 32 and 33 are rotatably mounted on the screws 39, so that they are held against rotation relatively to the hands of the mixer while the shaker is being rotated in the manner described.

It is thus seen that I have provided a cocktail shaker which is operable in a unique manner to produce a thorough mixing of the ingredients of cocktails or other beverages contained within the shaker which has a novel arrangement of actuating handles or knobs, which has novel features of construction, and which consists of a minimum number of parts, of inexpensive rugged construction, which can be quickly and easily assembled into a shaker of neat and attractive design.

It is also seen that I have provided a novel and unique method of mixing the ingredients of a cocktail or other beverage, as well as a novel and unique method of actuating or operating a cocktail shaker to mix the contents thereof.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A cocktail shaker of elongated form, said shaker having a handle rotatably mounted thereon adjacent one end of said shaker, and a handle rotatably mounted thereon adjacent the opposite end of the shaker, but at a side of the shaker which is substantially diametrically opposite that on which the first handle is mounted.

2. A cocktail shaker, as defined in claim 1, in which the shaker is of substantially cylindrical form.

3. A cocktail shaker, as defined in claim 1, in which one of said handles is located at approximately the same distance from one end of the shaker that the other handle is located from the other end of the shaker.

4. A cocktail shaker, as defined in claim 1, in which said handles are disposed in planes substantially parallel with a plane in which the axis of the shaker lies.

5. A cocktail shaker of elongated generally cylindrical form, a mounting screw extending radially from said shaker at a point adjacent one end of said shaker, a knob rotatably mounted on said screw, a second mounting screw extending radially from said shaker at a point adjacent the other end of said shaker, but at the side of said shaker diametrically opposite that at which the first-named screw is located, and a knob rotatably mounted on said second screw.

6. A cocktail shaker, as defined in claim 5, in which one of said screws is located at substantially the same distance from one end of the shaker that the other screw is located from the other end of the shaker.

7. A cocktail shaker having handles at diametrically opposite sides thereof, said handles being displaced from each other longitudinally of the shaker, each handle being rotatable independently of rotation of the shaker, and about an axis which is perpendicular to the axis of the shaker and intersects the axis of the shaker.

8. A cocktail shaker having handles at diametrically opposite sides thereof, said handles being displaced from each other longitudinally of the shaker, each handle being rotatable independently of rotation of the shaker and about an axis which substantially intersects the axis of the shaker.

ALBERT D. MORTRUDE.

REFERENCES CITED

The following references are of record in the file of this patent:

UNITED STATES PATENTS

| Number | Name | Date |
| --- | --- | --- |
| 140,527 | Munson | July 1, 1873 |
| 374,466 | Fitzsimmons | Dec. 6, 1887 |
| 1,713,979 | Redmond | May 21, 1929 |
| 1,966,611 | Cabel | July 17, 1934 |
| 1,977,649 | Sharp | Oct. 23, 1934 |
| 2,011,122 | Shields | Aug. 13, 1935 |
| 2,133,298 | Karfman | Oct. 18, 1938 |
| 2,178,500 | Singer | Oct. 31, 1939 |
| 2,208,431 | Rockow | July 16, 1940 |

FOREIGN PATENTS

| Number | Country | Date |
| --- | --- | --- |
| 325,347 | France | Feb. 27, 1903 |